United States Patent [19]

Stacey

[11] 4,309,752

[45] Jan. 5, 1982

[54] CYCLOCONVERTER APPARATUS WITH CONTROLLABLE END STOP FIRING PULSE CONTROL MEANS

[75] Inventor: Eric J. Stacey, Penn Hills, Pa.

[73] Assignee: Westinghouse Electric Corp., Pittsburgh, Pa.

[21] Appl. No.: 95,803

[22] Filed: Nov. 19, 1979

[51] Int. Cl.³ .......................................... H02P 13/30
[52] U.S. Cl. .................................................... 363/160
[58] Field of Search .......................... 363/10, 160–162, 363/165; 307/252 P

[56] References Cited

U.S. PATENT DOCUMENTS 3,400,321  9/1968  Lafuze ................................. 363/162
3,818,315  6/1974  Gyugyi et al. ...................... 363/160

OTHER PUBLICATIONS

Pelly, *Thyristor Phase-Controlled Converters and Cycloconverters*, Wiley-Interscience, 1971, pp. 259–271.
Gyugyi et al., *Static Power Frequency Changers*, Wiley-Interscience, 1976, pp. 279–322.

*Primary Examiner*—William H. Beha, Jr.
*Attorney, Agent, or Firm*—G. H. Telfer

[57] ABSTRACT

In power conversion apparatus such as a naturally commutated cycloconverter for use in converting the output of a variable speed generator to a constant frequency, there is provided an end stop control circuit for ensuring commutation of power switching devices that includes timing wave generators for both rectification and inversion end stops. The timing wave generators are phase locked with the generator outputs but are controllable by end stop bias signal derived from a variable system parameter that may be independent of the source, such as load current to provide prompt protection against converter malfunctions due to excess load currents.

Further provided is an excess current detector employing, for each phase, a pair of high slew rate, high current unipolar output op amps connected in a voltage follower configuration with a common pull-up resistor and a common load capacitor to develop a peak current signal representing the greater of the positive and negative peaks of the alternating phase current.

6 Claims, 13 Drawing Figures

CYCLOCONVERTER APPARATUS WITH CONTROLLABLE END STOP FIRING PULSE CONTROL MEANS

BACKGROUND AND SUMMARY OF THE INVENTION

This invention relates to electrical converter apparatus for producing AC power at a desired frequency from a source of AC power of a different or varying frequency. In particular, the invention relates to thyristor phase controlled converters and cycloconverters.

In a naturally commutated cycloconverter, it is desirable to control the occurrence of firing pulses. This function has been provided by a control system that, for example, compares integrated values of a reference sine wave voltage and the cycloconverter output to determine appropriate firing points. These normally occurring firing pulses may, under some conditions affecting the system, produce firing pulses at instances that are not favorable for operation of the power switching devices, normally thyristors, in a manner for optimum system performance. Therefore, an end stop control means is provided with imposes limits on the occurrence of the firing pulses. The end stop control overrides the basic firing pulse control means in order to limit the output waveform so as to ensure reliable commutation.

An end stop is provided to inhibit firing before the voltage wave reaches a certain angle; this end stop is referred to as the rectification end stop. Another end stop is provided to force a firing pulse to occur, if it has not already naturally occurred, by the time the voltage wave reaches a further certain angle; this end stop is referred as the inversion end stop. Thus the end stop control establishes the earliest and latest instants at which each thyristor may be fired and is capable of naturally taking over, or commutating, the current from its predecessor.

Cycloconverters to which the invention generally relates are described, for example, in Pelly, *Thyristor Phase-Controlled Converters and Cycloconverters*, Wiley-Interscience, 1971, wherein Chapters Nine and Ten (pp. 229-277) discuss firing pulse control techniques, particularly including at pp. 259-271 description of end stop control techniques. Also, see Gyugyi et al., *Static Power Frequency Changers*, Wiley-Interscience, 1976, pp. 279-322 on control circuit principles and especially pp. 308-311 on end stop control.

In U.S. Pat. No. 3,818,315 by Gyugyi, Pelly and Stacey, June 18, 1974, for example, is described an end stop control means providing end stop pulses, developed independently of the reference voltage, to override the normally produced pulses when a reference voltage variation outside predetermined limits occurs. Such apparatus and other prior end stop control means have limits that are fixed at some preset phase angles relative to the source voltages. With these fixed settings, it has not been possible to obtain end stop limits that are reliably safe for commutation when the cycloconverter is subjected to load faults, without severely restricting the output under normal conditions. It was in order to achieve controllable end stop limits in accordance with system transients such as those arising from load faults that the present invention concerning a new type of end stop control came about.

In summary, the present invention provides, in combination with the basic elements of a thyristor phase controlled cycloconverter, a new end stop control means wherein the end stop limits are controllably determined for the inversion and rectification limits by independent sets of phase locked timing waves. These timing waves are derived in a way such that they can be modified in phase to constrain or broaden the permissable range of firing angle as required by system parameters including those occurring due to transients such as load faults. Each line to neutral voltage from the generator has associated with it means for producing the two timing waves for setting the rectification and inversion end stop limits for that phase.

Additional benefits provided by the present invention as compared to prior art systems include the controllability of end stop timing to ensure not only reliable communication of the cycloconverter thyristors but also assurance that commutation occurs within limits providing optimum system performance. In particular, the performance of systems in accordance with this invention can assure the output voltage of the cycloconverter is constrained within optimum limits in accordance with conditions such as source voltage, source frequency, and load current. By relating the controllable end stop means with load current sensing circuitry, fast acting limitation of fault currents is achieved. Included herein is fast excess current detector circuitry that is advantageous both in the present application to end stop controls as well as elsewhere.

By the use of the present invention, cycloconverters can be devised in which the multiple purposes of high reliability, quality and efficiency can be more readily achieved in an economical system that reduces generator rating requirements, such as by about 15%.

DESCRIPTION OF THE PREFERRED EMBODIMENTS

Reference is made to the following copending applications: Stacey, application Ser. No. 095,899; Stacey et al, application Ser. No. 95,820, and Stacey et al, application Ser. No. 095,898, all of which are filed of even date herewith and assigned to the present assignee. These applications are referred to as they disclose features of cycloconverter apparatus also useful in systems in accordance with the present invention. The present description will be directed primarily to description of the end stop control means while other aspects of preferred systems are disclosed in the copending applications. However, it will be understood that the present invention may be employed without employment of the features of the copending applications and while employing existing state of the art techniques as to other aspects of the system.

Also incorporated by reference herein are the following patents: Gyugyi et al, U.S. Pat. No. 3,818,315, June 18, 1974, as was referred to in the Background portion of this application; Gyugyi et al, U.S. Pat. No. 3,585,485, June 15, 1971; Gyugyi et al, U.S. Pat. No. 3,852,654, Dec. 3, 1974; and Gyugyi et al, U.S. Pat. No. 3,876,888, Apr. 8, 1975. The foregoing patents contain descriptions useful in the implementation of the present invention in an overall cycloconverter system, particularly, but not being limited to, one characterized as a variable speed, constant frequency (or VSCF) drive system which is of particular interest in aircraft applications wherein a generator, normally a multi-phase generator, that is driven at a variable speed by a prime mover such as an aircraft engine has its output power conditioned by cycloconverter apparatus to maintain a constant frequency. As an example, where three phase power at 400 Hz is the desired output, the source is typically a six phase generator producing voltages three to six times (1200 to 2400 Hz) the output frequency.

In the context of an overall system as generally described and illustrated in FIG. 1 of above-mentioned U.S. Pat. No. 3,818,315, the present invention has particularly to do with improvements within an "Integrating Control" portion of the apparatus that provides firing pulses to the "Thyristor Firing Circuits". However, it will be understood the invention may be applied to firing pulse control schemes, other than integrating control, including the well-known cosine wave-crossing technique.

Figure 1:
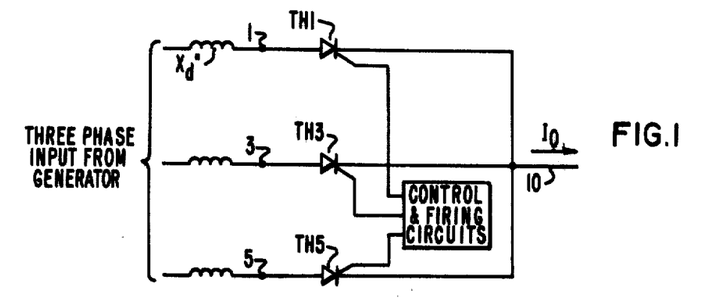
FIG. 1 is a partial schematic circuit diagram of one thyristor bank of a cycloconverter presented for purposes of explaining the objectives of the present invention.
Figure 2:
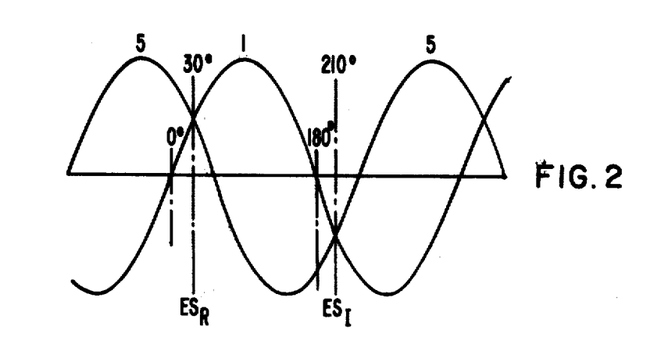
FIG. 2 illustrates waveforms related to the apparatus of FIG. 1.

To further set the context for the present invention and to clarify the requirements sought to be met, reference is made to FIGS. 1 and 2 of the attached drawings. FIG. 1 shows a three pulse group of thyristors in the positive bank of a multi-phase cycloconverter. For a six-phase source, another three pulse group, not shown, would also be provided for the positive bank as well as complementary groups for the negative bank. The thyristors, identified as TH1, TH3 and TH5 (sometimes referred as controlled rectifiers or SCR's, generally any gated power switching devices), are respectively connected at their anodes to different phases of a multiphase alternating current generator. The phases are identified as phases 1, 3 and 5 and they represent three phases of, for example, a six-phase generator. Each phase has associated with it an inductive sub-transient reactance of the generator conductors referred to as $X_d''$. The thyristors are connected in common at their cathodes and to a line 10 on which the load current $I_0$ is carried. In proper operation, the thyristors are each fired by the control and firing circuits for conduction in sequence, such as numerical order TH1, TH3 and then TH5 with the load current $I_0$ being carried by each in turn. In order for commutation of load current from one device to the next to occur, the current $I_0$ must be positive and the oncoming device must be forward biased by the generator voltage at its firing instant.

Commercially available thyristors exhibit a reverse recovery time ($t_{rr}$) which must be taken into account in achieving proper commutation. Also, a finite commutation time is required for current transfer, the speed of which is limited by generator reactances $X_d''$. FIG. 2 shows the generator line to neutral input voltages 1 and 5. Assuming the conduction of thyristor TH5 on line 5, the question then becomes how to ensure proper commutation to effect conduction of thyristor TH1 on line 1 which is next in sequence. The above-described proper conditions for commutation from TH5 to TH1 will normally occur in the area between points at 30° and 210° on the voltage waveform for phase 1. If natural commutation does not occur, it is the purpose of this invention to provide a rectification end stop $ES_R$ at 30° and an inversion end stop $ES_I$ before 210° to ensure firing pulses are supplied and commutation occurs within those limits.

An inversion end stop must be applied before 210° on the wave diagram to allow for maximum commutation overlap and thyristor reverse recovery periods. The limiting value of 30° for rectification end stops is not as essential and is chosen for symmetry providing convenience in system design. Some useful converters may be provided with inversion end stops, without rectification end stops, and adequate performance can be attained. The following description assumes the use of both inversion and rectification end stops, as that is the preferred form.

In the past, the end stop limits were relatively fixed and were as close to the 30° and 210° limiting values as could be permitted. Safe limits had to be set for overload and transient conditions and undesirable restriction of the permitted range of firing angles under normal load was therefore imposed. This restriction required that the generator voltage rating be selected with excess capacity, compared to what was otherwise necessary, to achieve normal output voltage.

It is now recognized that the disadvantages of using prior art end stop limits can be avoided by the end stop limits being automatically adjusted in response to source and load conditions.

Restricting the range of firing angle further within the limits of 30° to 210° to some more limited range can moderate the output voltage magnitude, increase available commutation time, and also increase available commutation voltage. The availability of a greater commutation voltage causes a quicker transfer of current across the subtransient reactances of the two generator lines. During this current transfer of commutation period, if the output current is assumed constant, the terminal voltages of the two lines being commutated, which are effectively shorted, is the mean value of the generators two internal EMF's produced by the two generator windings. Additionally, the commutation period itself is dependent on several factors including (1) the magnitude of generator voltage, (2) the magnitude of load current, (3) the value of subtransient reactance, (4) the generator frequency, and (5) the firing angle of the oncoming thyristor. In order to achieve reliable operation at all times, end stop controls should suitably constrain the range of firing angle when the generator voltage and the load current are transiently out of control.

Figure 2A:
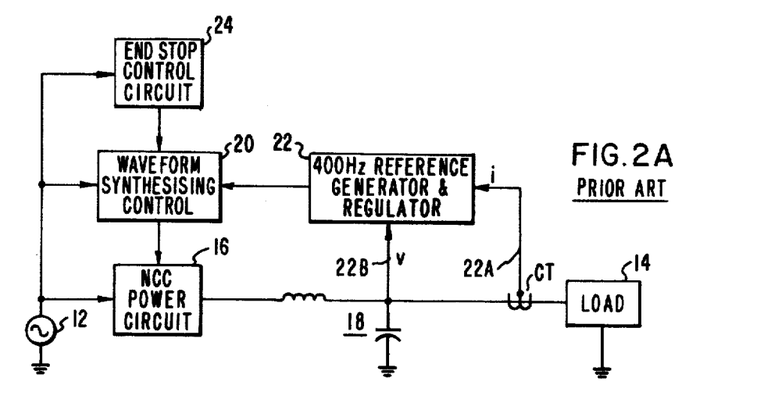
FIG. 2A is a schematic circuit diagram of a cycloconverter with end stop control in accordance with the prior art.

With reference to FIG. 2A, a further representation of cycloconverter apparatus with end stop control means in accordance with the prior art is presented in a one line diagram. The generator 12 and load 14 are connected in a circuit of which a principal branch includes the naturally commutating cycloconverter (NCC) power circuit 16 of banks of thyristors which modify the input waveform to produce an output waveform at fixed frequency. This output is first smoothed to a more uniform sinusoidal configuration by the depicted LC filter 18 and then supplied to the load. The generator output also is applied to waveform synthesizing control circuitry 20 that produces the desired firing angles for the power switches in the power circuit. This portion of the circuitry will sometimes be referred to as the firing pulse control circuitry or integral control although other than integrating control circuitry may be used in accordance with known practice. The control circuitry 20 has applied to it a fixed frequency reference signal from circuit portion 22 which in the application of particular interest is a 400 Hertz signal which is generated internally and whose magnitude is controlled by the current and voltage in the load circuit and supplied on lines 22A and 22B, respectively. The block 22 depicted also includes regulation components to maintain a suitable magnitude of reference signal in order to maintain the cycloconverter output at the desired level.

The generator output is also applied to end stop control circuitry 24 that, as before described, provides an additional limit on the operation of, or overrides, the control circuitry 20 firing the power switches. As depicted in FIG. 2A, which is representative of the prior art, the end stop control circuitry 24 is not responsive to transients in the load circuit.

Reference may be made to U.S. Pat. Nos. 3,818,315 and 3,876,888 for description of aspects of the end stop control 24 and the reference generator 22 as have been previously used. It is preferred that the regulator of the reference generator 22 be relatively slow in reacting to load current variations, such as within about three or four cycles at 400 Hz, in order to maintain a high quality sinusoidal output. Thus, the apparatus of FIG. 2A is not responsive to brief transients in load current that may occur within a fraction of a cycle.

Figure 2B:
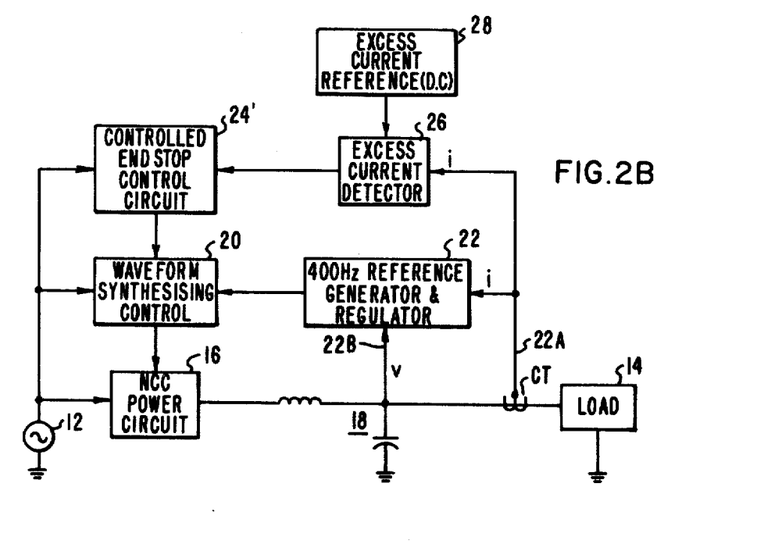
FIG. 2B is a schematic circuit diagram of a cycloconverter with end stop control in accordance with the present invention.

FIG. 2B shows a block diagram generally similar to that of FIG. 2A but with the addition of significant elements to achieve a system in accordance with the present invention. The current transformer CT in the load circuit supplies a current sensed from load current on line 22A not only to the regulator of reference generator 22 but also to a fast acting current detector 26. Detector 26 compares that current signal with an excess current reference from reference source 28 and supplies an error signal to the end stop control circuit 24' when the load current exceeds the excess current reference. Current detector 26 is fast acting, such as about 200 to 300 microseconds, a fraction of a cycle of output current, in order to quickly modify the occurrence of an end stop if the load current exceeds a predetermined limit. In this way, the end stop control 24' can adjustably provide end stop signals to the control circuit 20 so as to more reliably ensure commutation in response to three significant system parameters: source voltage, source frequency, and load current. This is done in a manner that does not impose any severe restriction on the output under normal conditions.

Although it is illustrated in FIG. 2B that the end stop control 24' is responsive to load current, it will be apparent from the ensuing discussion that the parameter controlling end stop signal variations may be other than excess load current. Excess load current is however a serious condition and one which the present invention is particularly concerned with.

In preferred forms of implementing the above-described concept in accordance with the present invention, practical end stop limits are controlled for inversion and rectification by two independent sets of phase-locked timing waves. These timing waves are derived in such a manner that they can be easily modified in phase to constrain or broaden the permissible range of firing angle as required. Each line-neutral voltage from the generator has associated with it two timing waves for respectively setting rectification and inversion end stop limits.

Figure 3:
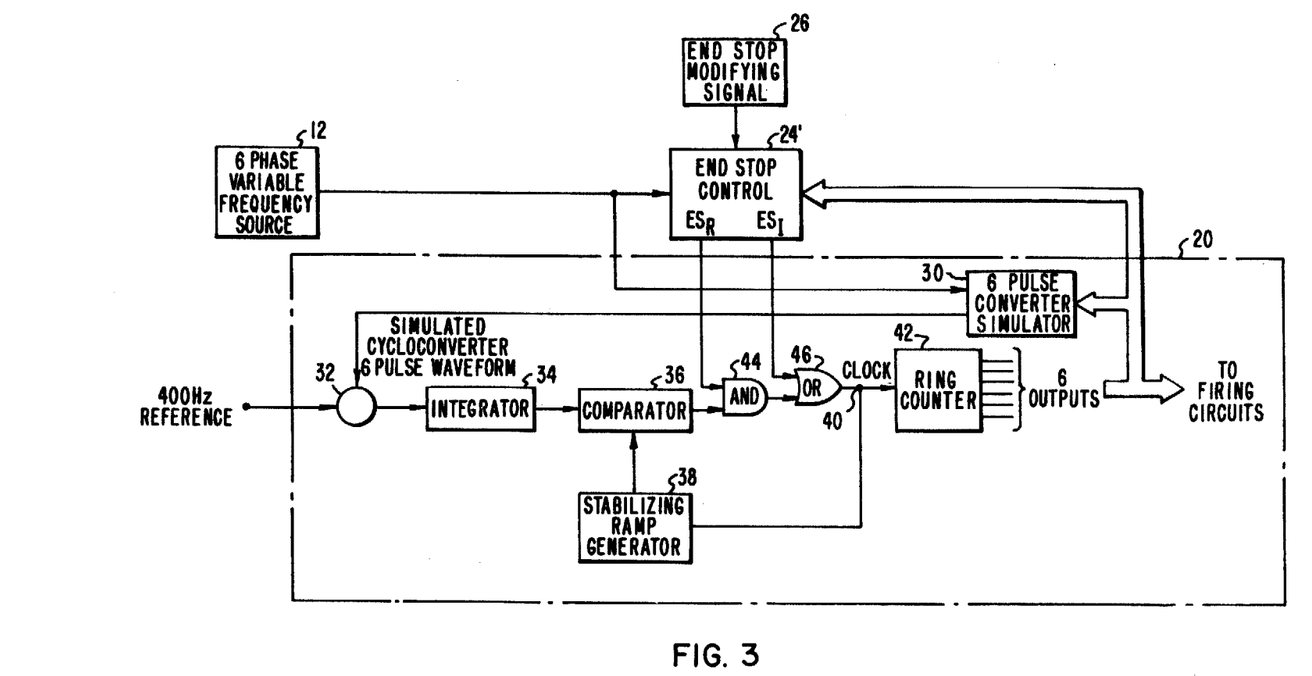
FIG. 3 is a schematic circuit diagram of circuitry in accordance with an embodiment of the present invention for associating end stop control circuitry with a firing control circuit of the integrating type.

By way of more specific example, FIG. 3 illustrates the end stop control 24' in association with a preferred form of waveform synthesizing control 20. Control 20 is a form of integral control employing principles of prior art such as Gyugyi et al. U.S. Pat. Nos. 3,585,485 as well as Stacey et al. application Ser. No. 95,898, filed concurrently herewith and assigned to the present assignee, which should be referred to.

In FIG. 3, the multi-phase (e.g., six-phase) source 12 supplies source voltages through a six-pulse converter simulator or multiplexer 30 to a summing point 32 also receiving the 400 Hz. reference signal. The simulator 30 may be a set of analog switches. From point 32 the signals are applied to an integrator 34 producing an integrated output supplied to a comparator 36 with feedback around through a stabilizing ramp generator 38. Basically, there are provided at point 40 a series of clocking pulses supplied to a multi-stage shift register or ring counter 42 whose outputs are applied sequentially to the thyristor firing circuits.

The outputs of ring counter 42 are also applied back to the simulator 30 as well as to the end stop control circuit 24'. The signal processing in the end stop control circuit 24', to be described more fully hereinafter, as influenced by the end stop modifying signal source 26 (such as an excess load current signal) is arranged to produce rectification and inversion end stop signals $ES_R$ and $ES_I$. Logic gates 44 and 46 are located between the integral control comparator 36 and ring counter 42 in order to selectively process the end stop signals.

What basically occurs, in this mode of operation presented by way of example, is that the end stop control 24' compares the states of the outputs of ring counter 42 with the generator voltage and the resulting end stop signals are applied to control the signals from comparator 36 to the ring counter 42. Rectification end stops $ES_R$ are, for example, selected to be normally a logical "one" signal so long as system parameters are within predetermined safe limits. Then, if those limits are exceeded, $ES_R$ changes to a "zero" state thus changing the output of AND gate 44 to zero and inhibiting the application of a clocking pulse to ring counter 42 and avoiding a premature firing pulse.

The inversion end stop signals are chosen, for example, to be normally at logic "zero" when the integral control generates firing pulses within the permitted range. The positive going clocking pulses generated at the output of comparator 36 pass through OR gate 46 and are not affected by the inversion end stop signal $ES_I$ while it remains at "zero". When the permitted operating range is exceeded and the system operates in inversion end stop, the comparator 36 output will remain at "zero" and the positive going inversion end stop signals $ES_I$ will be transmitted through the OR gate 46 to clock the ring counter when required.

Figure 4:
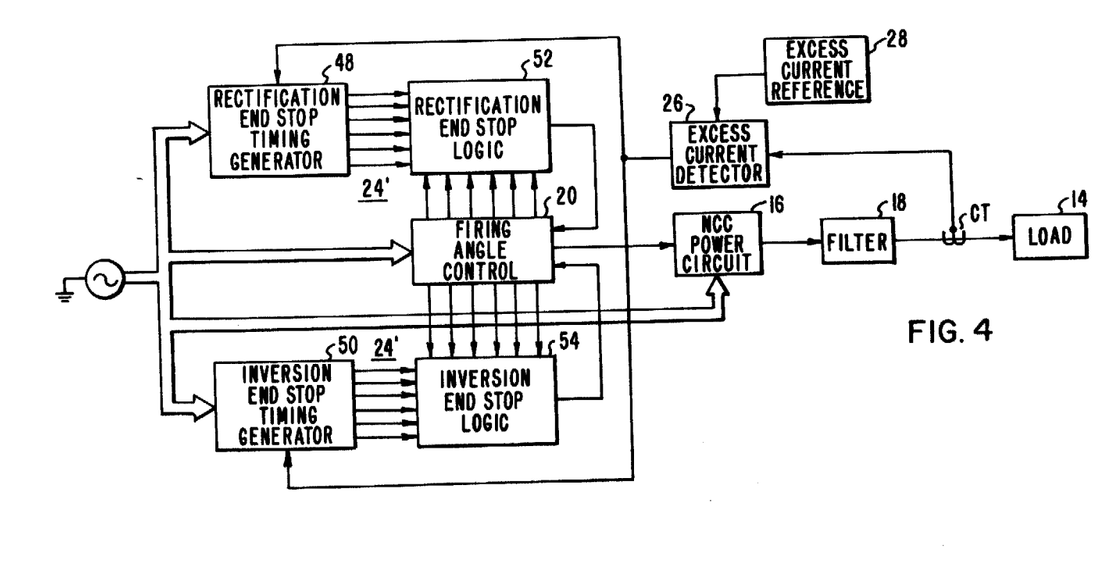
FIG. 4 is a schematic circuit diagram of an end stop control circuit in accordance with the present invention.

To describe the elements of end stop control circuit 24' and how $ES_R$ and $ES_I$ signals are produced in accordance with preferred forms of the invention, reference is made to FIG. 4. Key elements include a rectification end stop firing wave form generator 48, an inversion end stop timing wave form generator 50, a rectification end stop logic circuit 52, an inversion end stop logic circuit 54 and an excess load current signal source 26.

Each timing wave generator 48 and 50 produces six-phase square waves that are phase locked to the source voltages from generator 12 and are subject to influence by the excess current signal from detector 26. An excess current signal from 26 causes a shift in the outputs of the timing generators 48 and 50 such that the rectification timing generator 48 can retard, or delay, the rectification end stop and the inversion end stop timing generator 50 can advance the occurrence of the inversion end stop.

The logic circuits 52 and 54 respectively process the timing wave forms from timing wave generators 48 and 50 with the shift register outputs produced of the integral control circuit 20 so that the inhibiting $ES_R$ signals and forcing $ES_I$ signals can be produced and applied to the control circuit 20 as described in reference to FIG. 3.

The invention therefore achieves the purposes of controlling end stop limits to ensure reliable commutation in a manner that permits the use of load current sensing to enable fast acting limitation of fault current and to constrain the maximum output voltage of a cycloconverter in response to source voltage, source frequency, and load current. Additionally, it can be seen that different or other parameters may be employed to modify the timing waves and the resulting end stop signals. While various specific means are described and illustrated for the implementation of the present invention, it will be understood that various additional means may be applied thereto in accordance with the state of the art of power electronics and logic circuitry.

Figure 5:
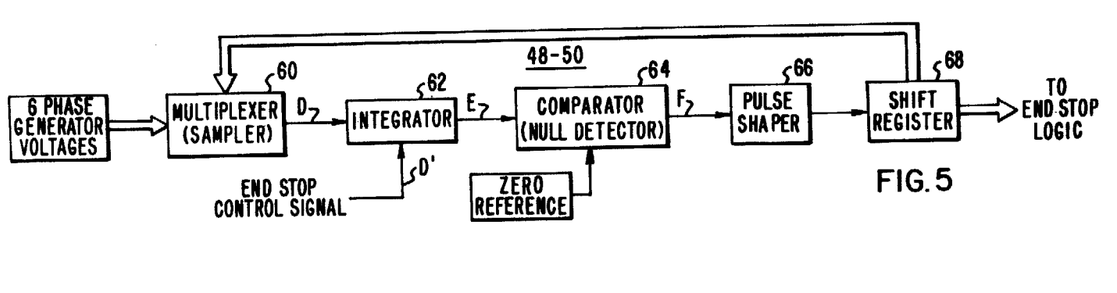
FIG. 5 is a schematic circuit diagram of a timing waveform generator in accordance with an embodiment of the invention for end stop control.

A preferred form of timing wave generator is illustrated in FIG. 5. One such timing wave generator 48 or 50 is provided for each of the rectification and inversion end stop controls. The two timing generators for rectification and inversion end stops may be alike or substantially the same with differences between them as will be described. The timing wave generator of FIG. 5 bears similarity to integral control circuitry 20 as shown in FIG. 3 but is of course separate.

The timing generator is to produce six phase locked waves that are stable in relation to the generator fundamental terminal voltages and not appreciably affected by instantaneous distortions of those voltages. Consequently, a sampling process is used in which analog switches in the multiplexer 60 are provided to sample the six phase generator voltages over a predetermined sampling period, such as 180°, to avoid effects on the end stop control of the generator voltage distortions of brief duration. The sampling period may be selected to be of shorter duration, such as 60°, if the generator internal impedances are low and thus the source voltages are more stable. Sampling may be performed of the phase voltages in various ways. Individual phase voltages may be sampled. Alternatively, the multiplexer 60 may rely on differences between complementing phases, such as the difference between phase 1 and phase 4 which will provide a doubled input. If the source is particularly stable, then it is possible to just sample some phases such as three of six phases which will permit some simplification of the timing generator circuitry.

Figure 6:
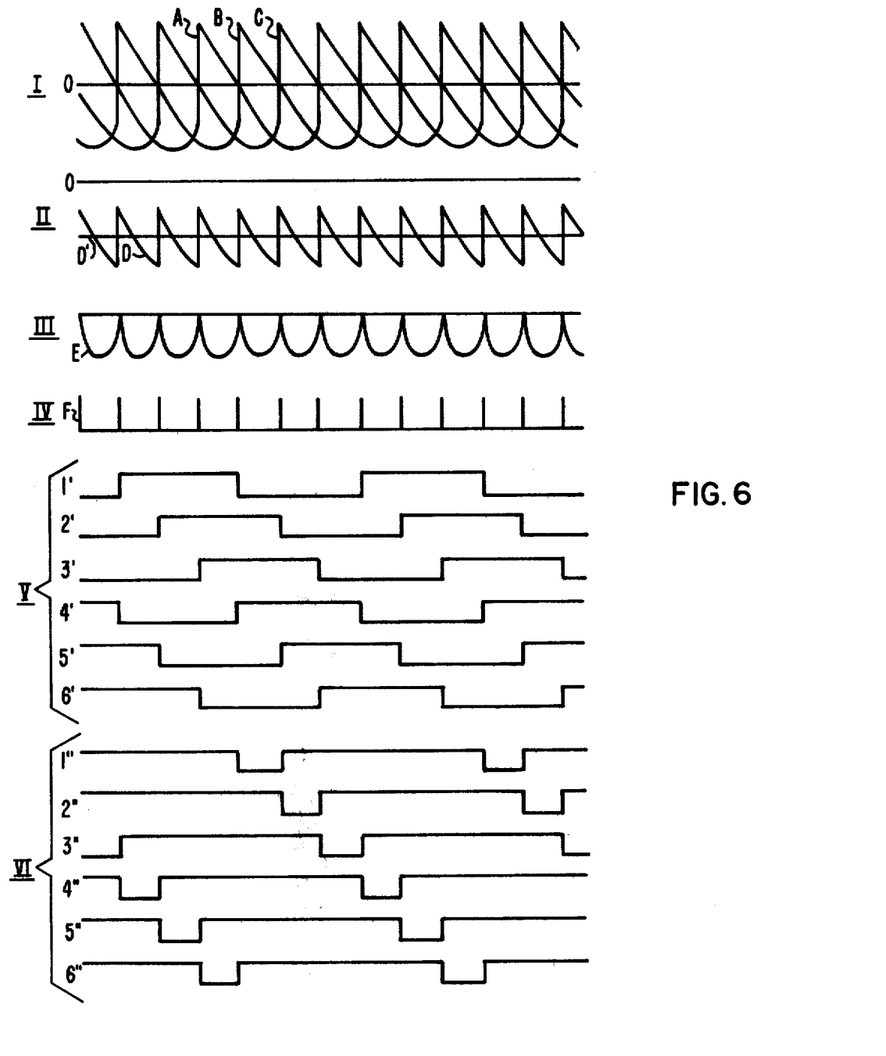
FIGS. 6, 7 and 8 are diagrams of waveforms for illustration of the operation of systems in accordance with the invention.

By way of example, the multiplexer 60 provides a set of two pulse waveforms of generator line to neutral voltages illustrated in part I of FIG. 6 and identified as A, B and C which are summed and supplied to an integrator 62 as a current waveform D of the character shown in part II of FIG. 6. The current waveform is integrated in this example by an integrator 62 of the inverting type wherein the output E appears as shown in part III of FIG. 6 having zero valued peaks upon the occurrence of equally integrated areas of the summed two pulse waveforms of part II integrated about a control signal level D' as is derived from the excess current detector, or other timing wave modifier. Therefore, a shift in control signal D' causes a shift in the occurrence of the integrator outputs. The integrator signal E is applied to the comparator 64 that compares the signal with a zero reference and provides a signal pulse only upon the instant of the zero integrator output, the comparator output F being shown in part IV of FIG. 6.

Between the comparator 64 and shift register 66 there may be provided, if desired, pulse shaping elements 66 for sharpening the pulses from the comparator prior to their application to the clock terminal of a shift register 68. The shift register outputs are the timing waves illustrated as 1' through 6' in part V of FIG. 6 and these timing waves are supplied to both the end stop logic and also back to the multiplexer 60 for processing with the applied generator waveforms.

As shown in FIG. 6, part V, the timing waves 1' through 6' are 180° timing waves and such waves may be applied to the end stop logic directly. However, it is found expedient for inversion end stops to provide an additional set of logic elements to convert the 180° timing waves to 60° timing waves as shown in waveforms 1" through 6" in part VI of FIG. 6. This provides better coordination of the timing waves with the logic circuit that may be chosen and ensures that the inversion end stops occur only when the system is inverting. Although the overall wave shape is different between 1' and 1", this is not fundamentally a change in the timing pattern because the occurrence of changes from a one signal to a zero signal (coincident with the comparator output pulses F) are exactly the same.

It is therefore seen that the timing generator 48-50 produces timing waves phase locked with the generator voltages and modified in accordance with the control signal produced from the excess current detector 26 of FIG. 4. The actual end stop signals for rectification and inversion end stops may then be produced from the timing waves and firing angle control signals from the integral control.

Figure 7:
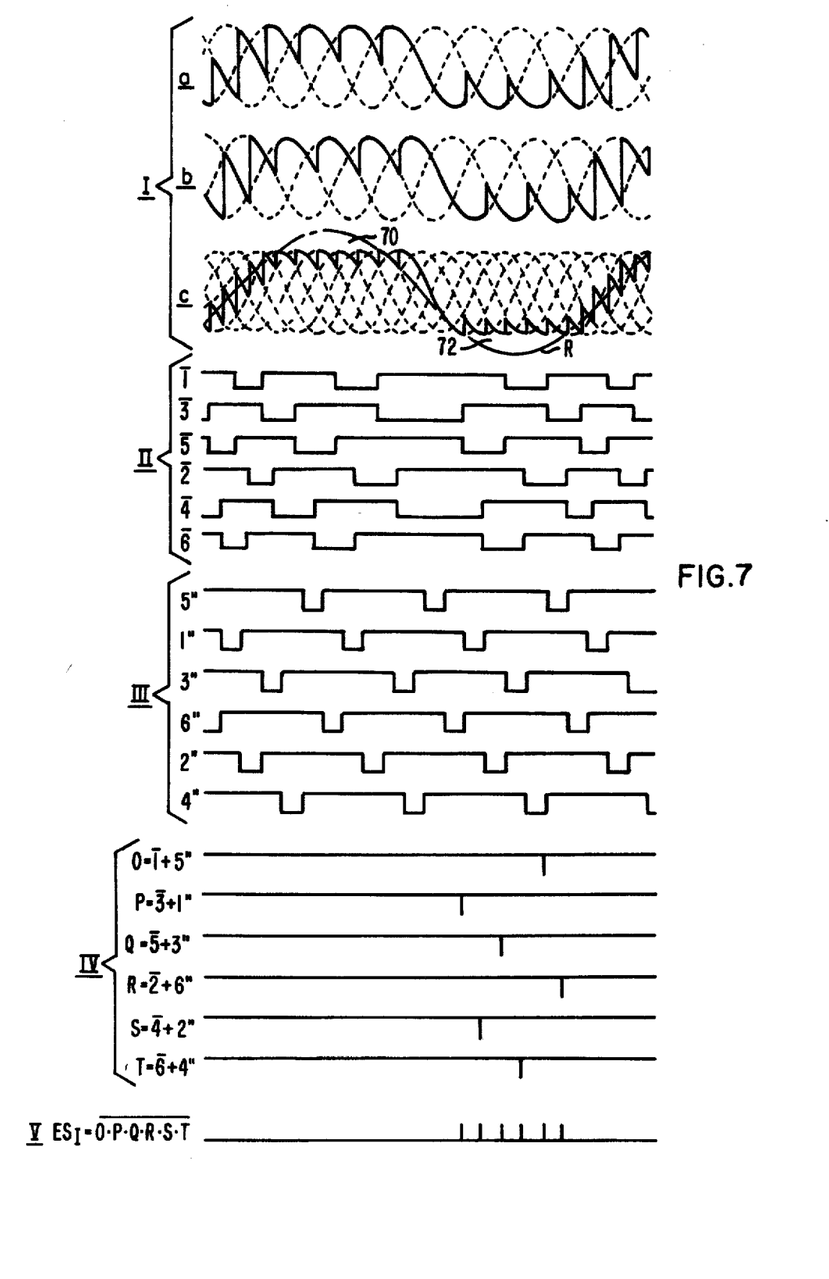

For explication of the actual production of end stop signals, reference is made to FIG. 7 which illustrates waveforms for positive converter bank inversion end stops. In part I of FIG. 7 are shown the generator waveforms including, in I(a), the output voltage for phases 1, 3 and 5, in I(b) the output voltages for phases 2, 4 and 6, and in I(c) a six pulse output voltage waveform including as well as a superimposed reference voltage waveform R. The solid lines in part I are the converter outputs. As is normally the case, the reference, such as 400 Hz, is a lower frequency than the individual voltages from which the converter output is produced.

It is basically the case that the end stop control comes into play when the reference voltage is of a magnitude exceeding that of the converter outputs, thus in one partial half cycle 70, where the waveform is positive, the rectification end stops come into play and in another partial half cycle 72, where the waveform is negative, the inversion end stops come into play.

The shift register outputs of part II of FIG. 7, from the firing pulse control circuit 20, called $\bar{1}, \bar{3}$, etc., indicate firing pulse application to the power circuit when negative. That is, the pulse to a given thyristor such as TH1 will be applied upon the occurrence of $\bar{1}$ being at its lowest level. Now for convenience, the inversion end stop timing waves are repeated in FIG. 7, part III, so they can be seen in connection with the shift register outputs $\bar{1}$, etc. and the logic outputs which are constructed so that an end stop pulse occurs in each instance upon their being a unique relation between selected ones of the shift register outputs and the timing waves. For example in FIG. 7, part IV, line 0 shows the occurrence of an inversion end stop upon 5" changing state from 1 to 0 causing $\bar{1}$ to change from zero to one. Similarly, in line P, an end stop pulse is produced upon the like conditions for $\bar{3}$ and 1", etc. FIG. 7, part V, shows the resulting inversion end stops, ES$_I$.

Figure 8:
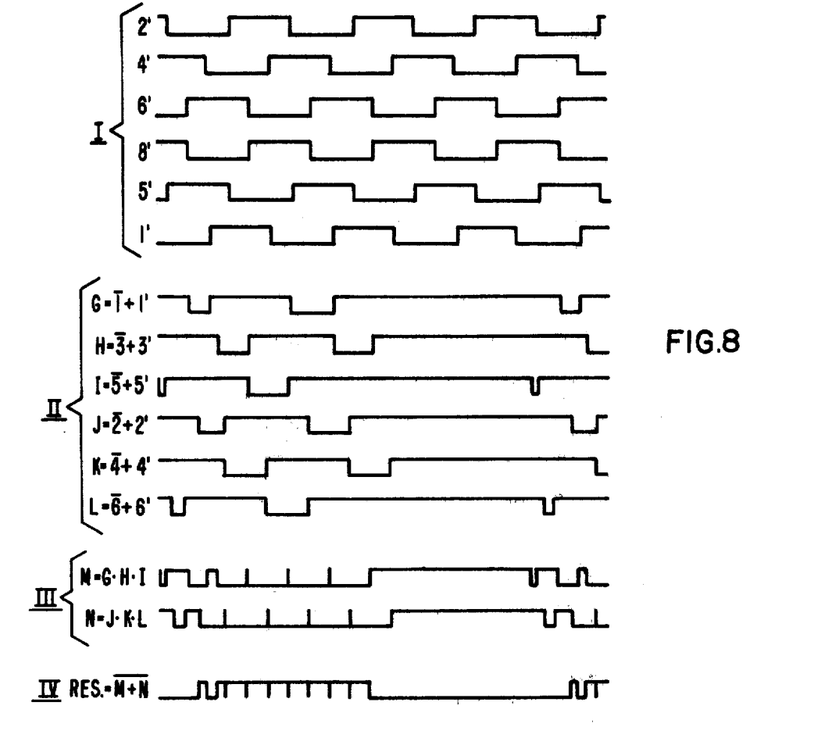

Further, in reference to FIG. 8, there are shown waveforms applicable to a positive converter rectification end stop control in which a similar process is employed to produce the rectification end stops on those instances in which the reference waveform R is positive exceeding the converter output (as in region 70, FIG. 7, part I(c)).

In FIG. 8, part I, are shown (like FIG. 6, part V) the rectification end stop timing wave forms 2', 4', 6', 3', 5' and 1' that are processed in the rectification end stop logic circuitry with the firing control circuit shift register outputs $\bar{1}$ through $\bar{6}$, as shown in part II of FIG. 7, to produce signals G through L representing respectively $\bar{1}+1'$, $\bar{3}+3'$, etc. Further logical processing results in signals M and N shown in part III of FIG. 8 that represent, respectively, G·H·I and J·K·L. In part III, the result rectification end stop wave from ES$_R$ is shown and is equal to $\overline{M+N}$.

From the foregoing description, it is believed clearly understood by those versed in the art of power electronics, particularly power converter technology and associated logic circuitry, how to implement an end stop firing control system in accordance with the present invention. Principally involved is the combination of converter apparatus and methodology that employs end stop circuitry that is responsive not only to the source and output waveforms but is also responsive to some other variable parameter or parameters, such, as but not limited to, load current magnitude. A key is the provision of timing generators whose outputs can be shifted in time in response to such other variable parameter. The timing wave forms, shifted or normal, are applied to logic circuitry that results in production of the desired end stops.

There are a variety of means from which a system designer may, within the context of the foregoing description, select suitable specific circuitry. However, it has been found particularly significant to achievement of overall system reliability, efficiency and economy to exercise careful judgment in the provision of that portion of the system by which the signal or signals modifying the timing waves is produced. Hence, the following description of preferred means for that purpose is presented.

Under normal conditions the end stop timing generators 48–50 are set to allow the maximum range of firing angle, as determined by the firing angle ("integral") control 20. To maintain fixed end stop limits, an end stop bias signal which has a DC level which is proportional to the generator (source) voltage is required. To ensure reliable operation under overload and fault conditions, the permissible range of firing angle is reduced by lowering the level of the end stop bias signal.

The bias signal which is derived from, and normally proportional to, the generator voltage may be reduced by the use of an undervoltage sensing circuit. Such an arrangement has been previously used to restrict the range of firing angles when the generator voltage decreases below its normal level.

Now, however, an alternative approach for reducing the bias signal is presented based on sensing the cycloconverters output current. Here a signal is obtained instantaneously whenever the output current exceeds its normal peak value by a predetermined amount. The signal obtained in this way is referred to as the "excess current" signal. Used alone, or in conjunction with other sensing means (such as undervoltage sensing) this signal may be used to effectively limit the maximum cycloconverter output current while ensuring reliable operation under overload and fault conditions.

Figure 9:
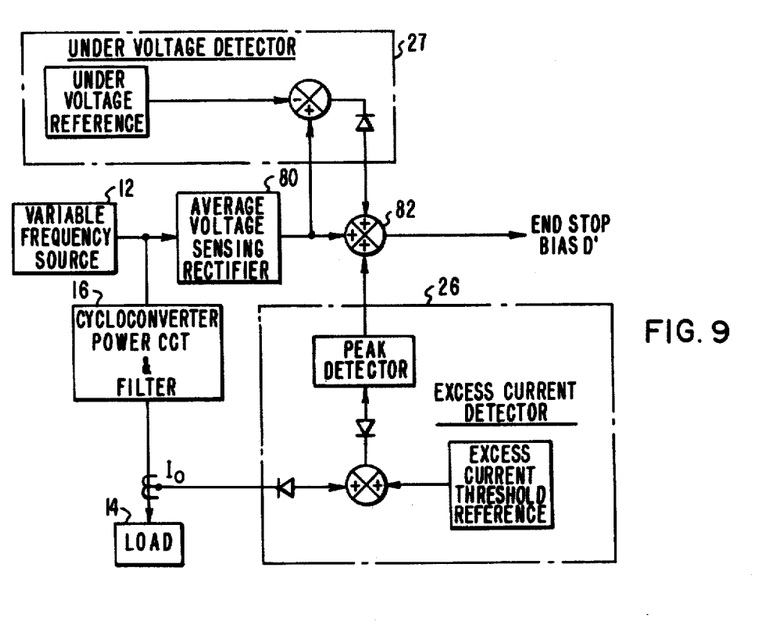
FIG. 9 is a schematic circuit diagram in block form of circuitry for deriving end stop bias signals in accordance with an embodiment of the invention.

A block diagram of a scheme combining "undervoltage" and "excess current" detectors 27 and 26, respectively, is shown in FIG. 9 with their basic elements illustrated, in association with the power circuit 12-16-14. The variable frequency generator 12 output is fed through an average sensing rectifier 80 whose output is then summed at point 82 with excess current detector 26 and under voltage detector 27 outputs. Normally the end stop bias output is not effected by these detector outputs since they remain at zero during normal operation. As soon as a load or fault is applied which causes a large enough peak cycloconverter current, a negative "excess current" signal is obtained which causes the resultant end stop bias signal D' to be reduced. Similarly, if the generator's average voltage fails below the "under voltage" reference level, a negative under voltage signal will cause the resultant end stop bias signal D' to be reduced.

Figure 10:
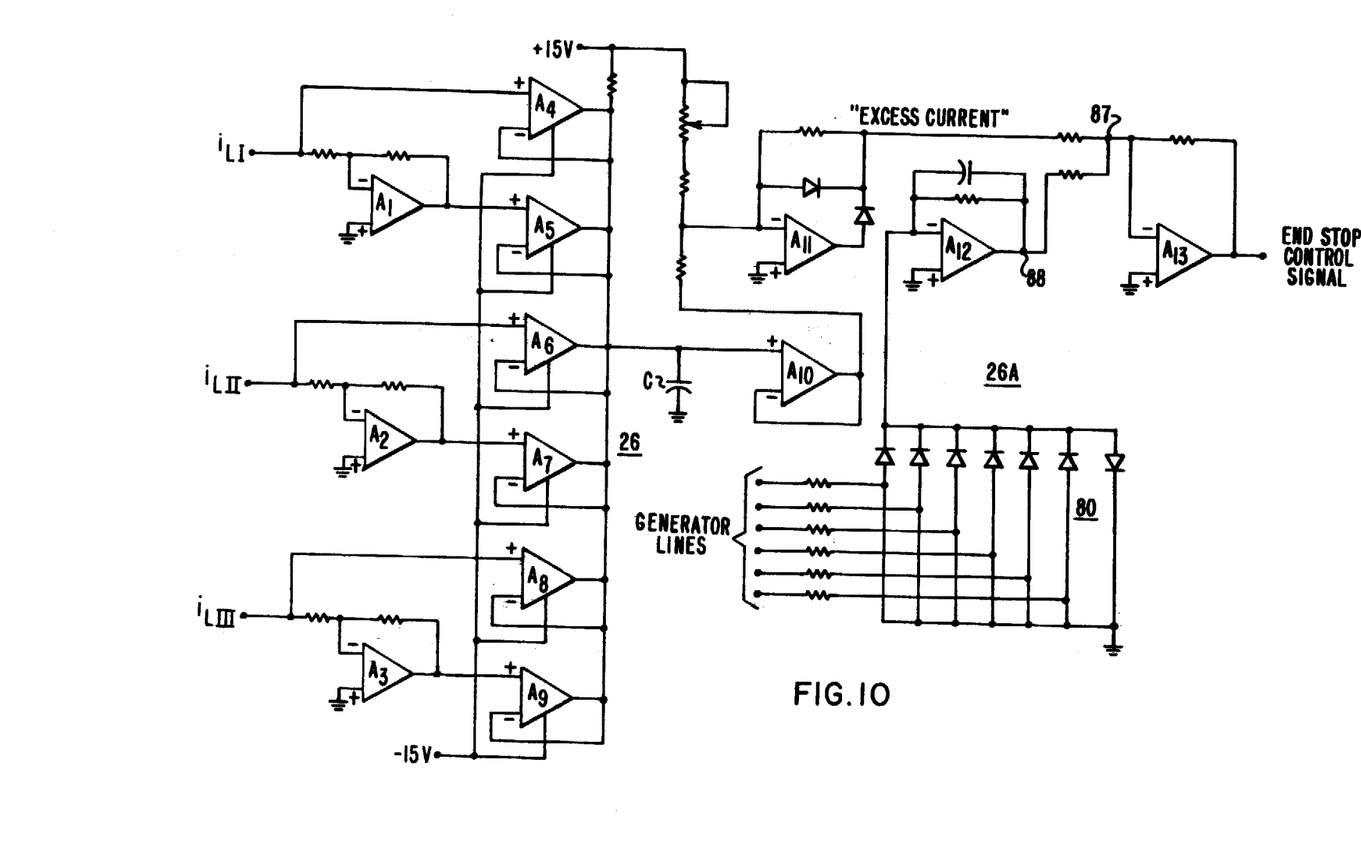
FIG. 10 is a schematic circuit diagram of an embodiment of an excess current detector and end stop biasing circuit in accordance with the invention.

A more detailed schematic of a preferred form of an excess current detector 26 and end stop biasing 26a circuit for a three output phase system is shown in FIG. 10.

Figure 11:
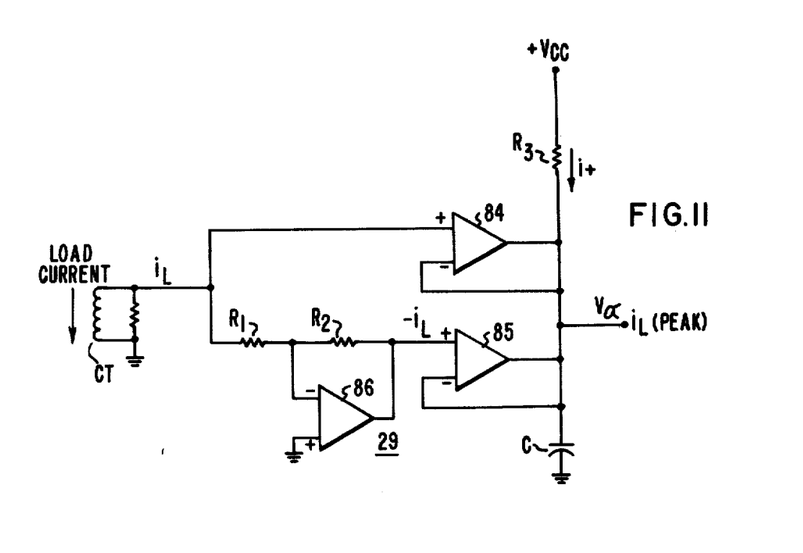
FIG. 11 is a schematic circuit diagram of an embodiment of a single phase peak current detector for the apparatus of FIG. 10.

To provide proper protection for all three output phases, which have common end stop timing, the magnitude of the largest phase current must be detected. FIG. 11 shows a peak current detector 29 for a single output phase. The arrangement shown employs two high slew rate, high current operational amplifiers 84 and 85 which can only produce negative output current, in voltage follower configuration. Operational amplifiers 84 and 85 are connected to produce like polarity outputs equal to the positive and negative values of the alternating current sensed by the CT. For this purpose, an inverting operational amplifier 86 is connected, with associated equal resistors R1 and R2, in front of operational amplifier 85. Having a common pull-up resistor $R_3$, and a common load capacitor C, their output will follow their input whenver it goes negative. The voltage on the capacitor C will then tend to remain at the most negative level reached, recharging only slowly due to the current (i+) in $R_3$. Since the inputs of those voltage followers 84, 85 are signals representing the cycloconverter output current, $i_L$, both direct and inverted, the peak current of either polarity is detected, and appears as a negative voltage $V\alpha i_L$ (peak) at the output across the capacitor C.

Referring again to FIG. 10, this system employing six unipolar output high slew rate, high current op-amps A4, A5, A6, A7, A8, A9 using a common output capacitor C and pull-up resistor R is readily applied to three output phases of the converter having respective currents $i_{LI}$, $i_{LII}$ and $i_{LIII}$. The output developed as a negative voltage across the capacitor C represents the maximum level of current of either polarity for all three phases. To prevent loading of the peak storage capacitor C, a voltage follower or buffer ampliifer A10 follows the voltage on C and is compared to a positive excess current reference signal by A11, which serves as a threshold detector. The output of op-amp A11 is clamped and can only go positive and will do so only when the excess current threshold is exceeded.

The output of A11 is the positive "excess current" signal and it is summed at point 87 with the signal representing the magnitude of negative average generator (source) voltage, derived at point 88, to derive the end stop control voltage at the output of op-amp A13. A12 and A13 are each connected for use as summing amplifiers, as shown.

Normally the excess current signal is zero and the bias signal is positive and proportional to the generator or source voltage. When an excess current exists, the resultant bias signal will be reduced.

This particular arrangement employing the peak current detector as described enables fast acting accurate excess current detection resulting in a very fast current limiting action by means of end stop control.

The peak current detector employed here uses the "current sinking only" ability of its output op-amps A4 through A9 to eliminate the need for diodes in a multi-input maximum peak detector. This peak current detector configuration is believed novel and useful in applications in addition to the converter apparatus as disclosed herein.

For the operational amplifiers A4, A5, etc., the desired characteristics can be readily achieved in the circuit as shown using device type LMIII, commercially integrated circuit device has inherent capability of operating as an operational amplifier with an output of only a single polarity. While a single such device is believed to have been previously used as a peak detector for a varying input of a single polarity, its use in combination with another such device in the circuit as shown for AC peak detecting is believed novel. Furthermore, it exhibits appropriately high slew rate (fast operation) and large current capacity. Other known operational amplifiers are substantially as effective with, however, the exception that in AC circuits their output can vary in polarity. Hence, if such devices are used in circuits in accordance with this invention, it is necessary that each of the pair of operational amplifiers for a given phase have a diode, or other unidirectional conductive device connected at its output to give a single, and the same, polarity output from the pair. The operational amplifier and its diode together comprises a "unipolar output operational amplifier" as used herein.

It is also to be noted that the pull-up resistor R and the common capacitor C are each relatively large (e.g., 100,000 ohms and 1 microfarad, respectively) to provide a long time constant (e.g., 0.1 sec.) compared to the load current waveform. This means that while the operational amplifiers A4, A5, etc. rapidly detect a peak load current, the detected peak signal is retained in the capacitor a relatively long time to ensure generating an appropriate end stop control signal. Other components illustrated in FIG. 10 are selectable in accordance with known practice. The operational amplifiers A1, A2, A3, A10, A11, A12 and A13 may each be a common type of operational amplifier such as type 741.

The foregoing examples are without limitation as to the variety of specific forms the inventive apparatus may take in accordance with the teachings herein.

I claim:

1. Cycloconverter apparatus comprising:

a naturally commutated power circuit for connection between a voltage source of varying frequency and a load to be supplied at a constant frequency, said power circuit comprising a plurality of thyristor type power switches;

means for generating a reference voltage at said constant frequency;

means for controlling the sequential application of firing pulses to said power switches in accordance with said reference voltage;

end stop firing pulse control means for constraining the occurrence of a firing pulse to a given power switch in accordance with load current, source voltage and source frequency.

2. Cycloconverter apparatus in accordance with claim 1 wherein:

said end stop firing pulse control means comprises a timing waveform generator for each line to neutral source voltage; said timing waveform generator comprising means for producing a series of signals that are phase-locked with the source voltage with a displacement directly related to an excess load current signal, logic circuit means for processing signals received from said means for controlling firing pulses and said timing waveform generator to produce an end stop control signal to constrain the period during which the means for controlling firing pulses upon occurrence of of an excess load current signal of a predetermined magnitude.

3. Cycloconverter apparatus in accordance with claim 2 wherein: said excess load current signal is developed by means including current sensing means for sensing load current, means for comparing the sensed load current with a D.C. reference signal and means for developing a differential excess current signal and applying said differential signal to said timing generator.

4. Cycloconverter apparatus in accordance with claim 3 wherein: said end stop firing pulse control means is arranged to constrain the latest occurrence of a firing pulse to a given power switch.

5. Cycloconverter apparatus in accordance with claim 4 wherein: said end stop firing pulse control means is arranged to constrain both the earliest and latest occurrence of a firing pulse to a given power switch and includes one of said timing waveform generators and logic circuit means for each of the rectification and inversion end stops.

6. Cycloconverter apparatus in accordance with claim 1 wherein: said means for controlling firing pulses comprises an integral control means wherein multiphase cycloconverter output waveforms are at least partially integrated with respect to a reference waveform to develop sequential firing pulses to said power circuit and said end stop control means overrides said integral control means by inhibiting or forcing occurrence of a firing pulse substantially instantaneously upon the occurrence of a load current that exceeds a predetermined magnitude.

* * * * *